United States Patent
Yamamoto et al.

[11] Patent Number: 5,862,976
[45] Date of Patent: Jan. 26, 1999

[54] BRAZEABLE ALUMINUM ALLOY CAST MATERIAL AND METHOD OF BRAZING THE SAME

[75] Inventors: Hideo Yamamoto; Shigeru Sato, both of Kogashi; Kohei Itoi, Sashimagun; Ryotatsu Otsuka, Osaka; Shoichi Sato, Oyamashi; Koji Ashida, Osaka, all of Japan

[73] Assignee: Showa Aluminum Corporation, Osaka, Japan

[21] Appl. No.: 679,377

[22] Filed: Jul. 8, 1996

[30] Foreign Application Priority Data

Jul. 10, 1995 [JP] Japan ................................ 7-173386

[51] Int. Cl.⁶ .................................................... B23K 1/19
[52] U.S. Cl. ........................................ 228/224; 228/262.51
[58] Field of Search ................................ 228/183, 223, 228/224, 207, 262.51

[56] References Cited

U.S. PATENT DOCUMENTS 5,529,639   6/1996   Sato et al. .................................. 148/26

FOREIGN PATENT DOCUMENTS

| 0 347 106 | 12/1989 | European Pat. Off. . |
| 0 661 130 | 7/1995 | European Pat. Off. . |
| 63-207494 | 8/1988 | Japan . |
| 2-243734 | 9/1990 | Japan . |
| 5-263173 | 10/1993 | Japan . |

OTHER PUBLICATIONS

Metals Handbook 8th Edition, vol. 8, pp. 392–393, 1973.
Patent Abstracts of Japan, pub #JP7090446, Apr. 4, 1995.
Patent Abstracts of Japan, pub #JP7041919, Feb. 10, 1995.

*Primary Examiner*—Samuel M. Heinrich

[57] ABSTRACT

Objects of the present invention are to provide a brazeable aluminum alloy cast material which can be manufactured brazeable products without lowering the productivity and the method of brazing a cast material.

The cast material is composed of: 0.5–4.5% by weight of Mn; 0.5–3% by weight of Si; 0.5–1% by weight of Fe; and the balance composed of aluminum and impurities. In the method of brazing the cast material, a brazing agent and/or flux are used, the brazing agent is composed of: 25–65% by weight of Zn; 2–7% by weight of Si; and the balance composed of aluminum and 0.1% or less of Fe as one of impurities. The flux is a mixture of: 0.5–5% by weight of LiF; 1–10% by weight of $ZnCl_2$; 1–5% by weight of $K_\alpha AlF_{\alpha+3}$ ($\alpha$ is an integer not less than 1.); and the balance composed of $BaCl_2$-KCl-NaCl.

8 Claims, 1 Drawing Sheet

BRAZEABLE ALUMINUM ALLOY CAST MATERIAL AND METHOD OF BRAZING THE SAME

FIELD OF THE INVENTION

The present invention relates to a castable and brazeable aluminum alloy cast material, and more particularly to an aluminum alloy adapted for die-casting material to be brazed and also to a method of brazing cast material.

BACKGROUND OF THE INVENTION

Products made from aluminum alloy casting are widely used as the parts of automobile vehicles, household electric apparatuses and the like. Those cast material are brazed one to another or to other expanded metal parts. The die-casting is suited to manufacture products of a sophisticated shape and having a smooth surface, rapidly and at a higher productivity. However, such die-cast material often suffers from a certain defect known as 'blister', when subjected to considerably raised temperatures. Thus, it has been difficult or impossible to employ material of die-cast aluminum alloy if they have to be heated to 450° C. and above when they are brazed.

The blister appearing on cast material is a partial outward expansion thereof. This problem is an irreversible deformation of surface layer of said cast material, due to thermal expansion of entrained air or hydrogen gas that was entrained into the article when a molten metal was forced into a mold. In other words, the surface layer yields or succumbs to a high internal pressure of the heated air or gas.

A reduced amount of the entrained gas has been expected to diminish the 'blistering'. Thus, the so-called slow squeeze-casting and SSF (semi-sintered piece forging) were proposed. By the squeeze-casting method, a molten metal is injected at a decreased rate into a mold, so as to effect the forging of a molten metal. It may also be useful to optimize the injection condition for the ordinary die-casting process in such a manner that the amount of entrained gas is reduced and/or prevented from concentrating in a surface layer of each cast material.

Productivity of squeeze-casting and SSF processes is much poorer than that of ordinary die-casting, and less suited to mass production of cast material. As seeking of optimum conditions takes long, and as a strict and severe control of ordinary casting process is mandatory, the operation efficiency is much lower than the ordinary die-casting. In consequence, it has been difficult for die-cast material to be brazed.

OBJECTS OF THE INVENTION

Accordingly, it is an object of the present invention to resolve these problems by providing an aluminum alloy of a novel composition, efficiently castable into material and suitable to subsequent brazing, and also by providing a method of brazing the material of aluminum alloy cast in a manner adapted to its novel composition.

SUMMARY OF THE INVENTION

The present inventors considered that materials of aluminum alloy casting which were strong and tough at high temperatures would withstand well the expansion pressure of entrained gas so as to be free of blister, even if the amount and distribution of the gas were not reduced or improved.

An aluminum alloy cast material provided herein to achieve the object is characteristically composed of: 0.5–4.5% by weight of Mn; 0.5–3% by weight of Si; 0.5–1% by weight of Fe; and the balance composed of aluminum and unavoidable impurities.

From one aspect of the present invention which provides a series of brazing methods, a method of brazing aluminum alloy cast material defined above makes use of the specific brazing agent. This brazing agent comprises: 30–60% by weight of Zn; 3–5% by weight of Si; and the balance composed of aluminum and impurities, wherein Fe as one of the impurities is controlled a concentration to 0.1% by weight or less. From another aspect, the method makes use of a specific flux that is a mixture of: 0.5–5% by weight of LiF; 1–10% by weight of $ZnCl_2$; 1–5% by weight of $K_\alpha AlF_{\alpha+3}$ ($\alpha$ is an integer not less than 1.); and the balance composed of the mixture of $BaCl_2$-KCl-NaCl. From still another aspect, the method makes use of specific brazing agent and flux, wherein the brazing agent comprises: 30–60% by weight of Zn; 3–5% by weight of Si; and the balance composed of aluminum and impurities with Fe as one of the impurities being controlled a concentration to 0.1% by weight or less, and wherein the flux is a mixture of: 0.5–5% by weight of LiF; 1–10% by weight of $ZnCl_2$; 1–5% by weight of $K_\alpha AlF_{\alpha+3}$; and a mixture of $BaCl_2$-KCl-NaCl.

Mn in the cast material enhances heat resistance thereof, thereby improving its strength at high temperatures. A content of Mn less than 0.5% by weight is not sufficient to ensure this effect while a content of Mn more than 4.5 * will impair the flowability and castability of molten alloy. Thus, Mn must be contained within a range from 0.5 to 4.5% by weight. Preferable range of Mn content is 1.5–4% by weight, and more preferably within a range of 1.5–3% by weight. The further element, Si, improves both the heat resistance and melt flowability of the aluminum alloy provided herein. As a content of Si less than 0.5% or more than 3% by weight lowers these effects, Si content must be within a range from 0.5 to 3%, and more preferably should be 1% by weight and more. Fe protects the molten alloy from sticking to a mold surface. As a content of Fe less than 0.5% or more than 1% by weight lowers this effect, Fe content must be within a range from 0.5 to 1%, and more preferably, should be 0.7% by weight or less within this range. The composition of the balance of the aluminum alloy cast material in the present invention is substantially aluminum and inclusion of unavoidable impurities is allowable.

The methods proposed herein are intended to work well in practice when brazing various aluminum alloy material that are previously cast, for instance die-casted, into given shapes at temperatures of 500°–550° C.

Al, Zn and Si are principal components of the brazing agent used in the method of the present invention.

Zn functions to lower the melting point of said brazing agent. Zn content less than 25% by weight is insufficient to realize a moderately lowered melting temperature so that the brazing can be carried out at 500°–550° C. Zn content exceeding 65% by weight will further lower the melting point, but the brazing agent melts in a wide range of temperatures, so that the brazing agent will produce voids in brazed regions and fail to ensure an airtight connection of the aluminum alloy cast material when it solidifies again. Thus, Zn must be contained at 25–65% by weight in the brazing agent. The lower limit of Zn content is preferably 30% by weight, and more desirably, 35% by weight. The upper limit of Zn content is 60% by weight, and more desirably, 55% by weight. Si does not only lower the melting point, but also narrows the range thereof. A Si content less than 2% by weight is insufficient, though the content more than 7% by weight will cause said effectiveness to be saturated and will affect the processability of brazing agent. Therefore, Si has to be contained in said agent within the range of 2–7% by weight, and the lower limit is preferably 3% by weight, and the upper limit is preferably 5% by weight.

The balance of a brazing agent is aluminum and Fe which is one of impurities. An excessive content of Fe promotes generation of voids when the molten brazing agent is solidified. Thus, Fe content must be controlled to contain 0.1% by weight or less.

A matrix component of the mixed flux recommended for use in the method of the present invention is $BaCl_2$-KCl-NaCl, which is less hygroscopic as compared with many other ordinary fluxes. A desirable composition of this matrix is: 49–53% by weight of $BaCl_2$; 23–27% by weight of KCl; and 15–19% by weight of NaCl. The matrix may contain a small amount of fluoride flux such as $KAlF_4$, $MgF_2$ or $CaF_2$, and an eutectic compound $KF+AlF_3$.

LiF and $ZnCl_2$ added to the flux matrix serve not only to lower the melting point thereof but also to improve its activity. While a content of LiF less than 0.5% by weight is insufficient to afford these effects, the content more than 5% by weight rather raises the melting point. LiF must be contained from 0.5 to 5% by weight, more desirably, from 1 to 3% by weight of the flux. A content of $ZnCl_2$ less than 1% by weight is insufficient to afford the effects on lowering the melting point and improving its activity while the content more than 10% by weight rather renders the flux too hygroscopic to be handled easily and to protect a brazing oven and brazing tools from damages.

$ZnCl_2$ must be contained within the range of 1% to 10% by weight, more desirably, from 3% to 7% by weight of the flux.

$K_\alpha AlF_{\alpha+3}$ ( a is an integer not less than 1.) is added to the flux so as to break an oxide member present on the material to be brazed when the brazing agent is heated up to or a little below its melting point. Examples of such $K_\alpha AlF_{\alpha+3}$ are $KAlF_4$, $K_2AlF_5$, $K_3AlF_6$ or the like. One or more of these compounds may be used as a mixture or as a complex thereof. A content of $K_\alpha AlF_{\alpha+3}$ less than 1% by weight is insufficient to afford the above effect, while the excessive content more than 5% by weight rather raises the melting point of the composite flux. $K_\alpha AlF_{\alpha+3}$ must be contained from 1% to 5% by weight, more desirably, from 2% to 4% by weight of the flux.

The articles to be brazed by the aluminum alloy cast material of the present invention may be of an article of the same composition as the cast material or one of the different composition or expanded metal. There is no limitation for the method of supplying the brazing material and the flux.

Brazeable aluminum alloy cast material provided herein comprises: 0.5–4.5% by weight of Mn; 0.5–3% by weight of Si; 0.5–1% by weight of Fe, as mentioned above. This composition affords an excellent strength of the cast material at high temperatures. Consequently, even if a noticeable amount of gas were entrained in the cast by heating, a surface portion of each cast material can withstand an expanding pressure and generation of blisters are restrained.

Therefore, the products manufactured by the conventional process of die-casting can be used at high temperatures between 500 ° C. and 550° C. and be brazeable. Productivity of the products is same as the conventional ones. Remarkable strength at high temperatures will be obtained if the alloy is composed of: 1.5–4% by weight of Mn; 1–3% by weight of Si; and 0.5–0.7% by weight of Fe of alloy.

Furthermore, blisters will not be produced by the method of brazing the aluminum alloy cast material in the present invention at temperatures between 500 ° C. and 550 ° C.

In a case wherein the brazing agent is an Aluminum alloy cast material composed of: 25–65% by weight of Zn; 2–7% by weight of Si; and aluminum as the balance including less than 0.1% by weight of Fe, the brazing agent will show a good melt flowability even at such high temperatures, to thereby offers high quality brazed products. The melt flowability will be most conspicuous if the aluminum alloy contains: 30–60% by weight of Zn; and 3–5% by weight of Si.

In a case wherein the flux is a mixture composed of: 0.5–5% by weight of LiF; 1–10% by weight of $ZnCl_2$; 1–5 % by weight of $K_\alpha AlF_{\alpha+3}$; and a matrix of $BaCl_2$-KCl-NaCl, the flux will melt entirely at high temperatures noted above to become so active as to afford high quality brazed products. This effect is most conspicuous if the flux contains 1–3% by weight of LiF; 3–7% by weight of $ZnCl_2$; and 2–4% by weight of $K_\alpha AlF_{\alpha+3}$.

THE PREFERRED EMBODIMENTS AND EXAMPLES

Figure 1:
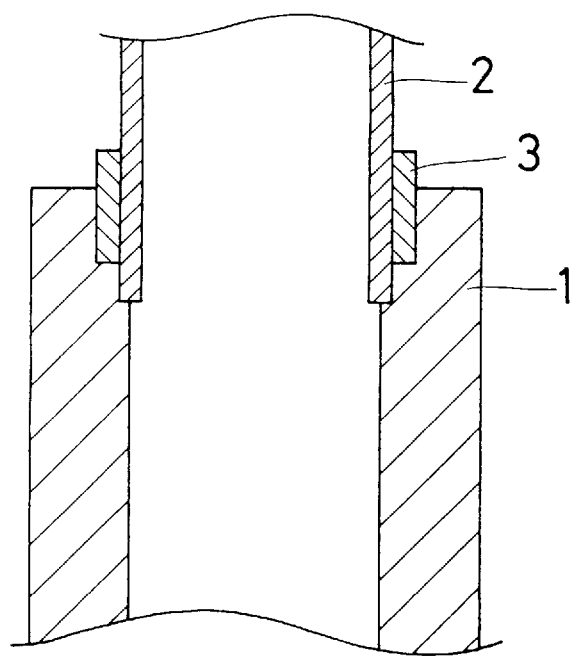
FIG. 1 is a vertical cross section of a lap joint comprising an aluminum alloy cast material of the present invention, wherein the brazing method proposed herin is illustrated.

The invention will now be described in detail on a brazeable aluminum alloy cast material in connection with one mode of the method of brazing the same, both proposed herein.

Aluminum alloy cast materials whose chemical compositions are listed in Table 1 were prepared at first. The cast material was then die-casted into pipes 1 as shown in FIG. 1, under the conditions listed in Table 2. Each pipe had one end whose inner periphery was recessed to provide a stepped region.

The aluminum alloy cast materials were casted and cut into pieces for a test of strength at high temperatures. Further, specimens severed from the respective cast pipes 1 were also tested as to their heat resisitance and corrosion resistance.

STRENGTH AT HIGH TEMPERATURE

Tensile strength was measured at 500° C. according to JIS Z-2241 (viz. Japanese Industrial Standards).

HEAT RESISTANCE

Each specimen was heated until a blister appeared in order to measure the highest tolerable temperature.

CORROSION RESISTANCE

Weight loss was measured after 180 cycles of corrosion test as defined in 'JASO CCT M609-91' (Viz. 'Corrosion Tests on Materials for Automobiles).

Results of these tests are shown in Table 1.

TABLE 1

| Alloys | Composition of alloys (% by weight) | Tensile strength (kgf/mm$^2$) | Tolerable temp. (°C.) | Corrosion loss in wt. (mg/cm$^2$) |
|---|---|---|---|---|
| EXAMPLES | | | | |
| I | Al -4% Mn -2% Si -0.9% Fe | 3.0 | 500 | 3.3 |
| II | Al -3% Mn -1.5% Si -0.6% Fe | 3.2 | 530 | 3.2 |
| III | Al -2% Mn -1% Si -0.6% Fe | 3.1 | 550 | 3.1 |
| REFERENCES | | | | |
| IV | ADC12 | 1.6 | 430 | 31.0 |
| V | AC4C | 1.2 | 450 | 12.4 |
| VI | AC4B | 0.9 | 400 | 68.4 |

Notes:
'temp.' = temperature, 'wt.' = weight,

TABLE 2

| | |
|---|---|
| Casting method: | Ordinary (evacuated) |
| Casting machine: | 125 t |
| Injection speed: | 1.8–2.5 m/s |
| Casting pressure: | ACC pressure, 140–160 kgf |
| Temperature of melting alloy: | 720–750° C. |
| Temperature of mold: | fixed parts - 200° C. movable parts - 140° C. |
| Repellent for mold: | water-soluble |
| Lubricant for sleeve: | oily |

As seen in Table 1, the brazeable aluminum alloy cast materials of the present invention are of higher strength at high temperatures. The material proved resistant to blister even at 550 ° C., even if the materials are manufacured by the ordinary die-casting method. They also proved remarkably superior to prior art cast materials in respect of corrosion resistance.

For the purpose of a test, the pipes 1 formed of alloys indicated in EXAMPLE I to III and extruding pipes composed of aluminum alloys of JIS A6063 were brazed each other using the brazing agent shown in Table 3 and the flux shown in Table 4. The combination of the sample pipes 1 with the brazing agents and fluxes is shown in Table 5.

Lap joints were prepared by fitting a lower end of each extruding pipe 2 in the upper end of each pipe 1, the upper end having an increased inner diameter. A ring 3 of brazing agent was placed on the upper end, and coated with a flux suspension which concentration is 60%.

After the flux suspension had dried, the lap joints were heated to and kept at 550° C. for 5 minutes, within nitrogen gas atmosphere. Subsequent to this brazing process, the sample joints were cooled down to a room temperature for evaluation of anti-blister property and brazeability. Visual inspection was carried out to check blister and appearance of the brazed portions, and X-ray inspection was done to determine the density of the sample. For measurement of strength of brazed joints, each of the specimen was longitudinally sliced into eight so that they were subjected to a breaking test at a room temperature. Joint strength was judged by a point where each specimen had been broken. The sample joints which were torn at their cast pipes 1 or extruding pipes 2 were rated 'passed', while those torn at their brazed regions were rated 'failed'.

Results of these tests are listed in Table 5.

TABLE 3

| Brazing agents | Composition (% by weight) | | | |
|---|---|---|---|---|
| | Zn | Si | Fe | Al |
| A | 40 | 3.5 | <0.1 | balance |
| B | 40 | 4.5 | <0.1 | balance |
| C | 50 | 3.5 | <0.1 | balance |
| D | 50 | 4.5 | <0.1 | balance |
| E | 20 | 2.5 | 0.2 | balance |

Notes:
The underlined figures are excluded from the scope of the present invention.

TABLE 4

| Fluxes | Composition (% by weight) | | | |
|---|---|---|---|---|
| | LiF | ZnCl$_2$ | AD-II* | STF-A** |
| (a) | 1.5 | 5 | 3.0 | balance |
| (b) | 3 | 5 | 1 | balance |
| (c) | — | — | — | 100 |

Notes:
1. The underlined figures are excluded from the scope of the present invention.
*Flux made by Showa Aluminum Corp. and consisting of: K$_2$AlF$_5$.H$_2$O + KAlF$_4$ + K$_3$AlF$_6$
**Mixed flux available from Kanto Yakin Kogyo Co., Ltd. and consisting of: 52.5% of BaCl$_2$ + 26.2% of KCl + 17.3% of NaCl + 2.0% of CaF$_2$ + 1.0% of KAlF$_4$ + 1.0% of MgF$_2$

TABLE 5

| Joints | Pipes | Brazing agents | Fluxes | Blister | Brazeability | | |
|---|---|---|---|---|---|---|---|
| | | | | | Dens. | App. | Str. |
| EXAMPLES | | | | | | | |
| 1 | I | A | (a) | No | Passed | Passed | Passed |
| 2 | I | B | (b) | No | Passed | Passed | Passed |
| 3 | I | C | (a) | No | Passed | Passed | Passed |
| 4 | I | D | (b) | No | Passed | Passed | Passed |
| REFERENCE | | | | | | | |
| 5 | I | E | (c) | No | Failed | Failed | Failed |
| EXAMPLES | | | | | | | |
| 6 | II | A | (b) | No | Passed | Passed | Passed |
| 7 | II | B | (a) | No | Passed | Passed | Passed |
| 8 | II | C | (b) | NO | Passed | Passed | Passed |
| 9 | III | D | (a) | No | Passed | Passed | Passed |

Notes:
The undersigned figures are excluded from the scope of the present invention.
'Dens.' = Density of brazed regions
'App.' = Appearance of brazed regions
'Str.' = Strength of lap joints As seen in Table 5, it was confirmed that an excellent brazeability was afforded even at a temperature from 500° to 550° C., by means of the specific brazing agent and/or the ly designed flux.

We claim:
1. A method of brazing aluminum alloy die-cast material comprising: 0.5–4.5% by weight of Mn; 0.5–3% by weight of Si; 0.5–1% by weight of Fe; and the balance composed of aluminum and impurities, wherein a brazing agent is used which comprises: 25–65% by weight of Zn; 2–7% by weight of Si; and the balance composed of aluminum and impurities, wherein Fe as one of the impurities is controlled at a concentration to 0.1% by weight or less.

2. The method of brazing aluminum alloy die-cast material as defined in claim 1, wherein the brazing agent contains 30–60% by weight of Zn.

3. The method of brazing aluminum alloy die-cast material as defined in claim 1 or 2, wherein the brazing agent contains 3–5% by weight of Si.

4. A method of brazing aluminum alloy die-cast material comprising: 0.5–4.5% by weight of Mn; 0.5–3% by weight of Si; 0.5–1% by weight of Fe; and the balance composed of aluminum and impurities, wherein a flux is used which is a mixture of: 0.5–5% by weight of LiF; 1–10% by weight of $ZnCl_2$; 1–5% by weight of $K_\alpha AlF_{\alpha+3}$ (a is an integer not less than 1.); and the balance composed of $BaCl_2$-KCl-NaCl.

5. The method of brazing aluminum alloy die-cast material as defined in claim 4, wherein the flux contains 1–3% by weight of LiF.

6. The method of brazing aluminum alloy die-cast material as defined in claim 4, wherein the flux contains 3–7% by weight of $ZnCl_2$.

7. The method of brazing aluminum alloy die-cast material as defined in claim 4, wherein the flux contains 2–4% by weight of $K_\alpha AlF_{\alpha+3}$ ($\alpha$ is an integer not less than 1.).

8. A method of brazing aluminum alloy die-cast material comprising: 0.5–4.5% by weight of Mn; 0.5–3% by weight of Si; 0.5–1% by weight of Fe; and the balance composed of aluminum and impurities, wherein a brazing agent and a flux are used, the brazing agent comprising: 25–65% by weight of Zn; 2–7% by weight of Si; and the balance composed of aluminum and impurities, wherein Fe as one of the impurities is controlled at a concentration to 0.1% by weight or less, with the flux being a mixture of: 0.5–5% by weight of LiF; 1–10% by weight of $ZnCl_2$; 1–5% by weight of $K_\alpha AlF_{\alpha+3}$ ($\alpha$ is an integer not less than 1.); and the balance composed of $BaCl_2$-KCl-NaCl.

* * * * *